United States Patent [19]

Kronogard

[11] 4,282,709

[45] Aug. 11, 1981

[54] GAS TURBINE-TRANSMISSION PLANT

[76] Inventor: Sven-Olof Kronogård, Karstorpsvägen 31, Lomma, Sweden, 23400

[21] Appl. No.: 59,163

[22] Filed: Jul. 20, 1979

Related U.S. Application Data

[63] Continuation-in-part of Ser. No. 834,920, Sep. 20, 1977, abandoned.

[30] Foreign Application Priority Data

Sep. 24, 1976 [SE] Sweden .................... 7610578

[51] Int. Cl.$^3$ .............................................. F02C 3/10
[52] U.S. Cl. ................................. 60/39.16 S; 60/39.43
[58] Field of Search ............... 60/39.16 R, 39.16 C, 60/39.16 S, 39.43, 39.5; 415/500

[56] References Cited

U.S. PATENT DOCUMENTS 3,498,057  3/1970  Kronogard et al. ............ 60/39.16 S
4,054,030  10/1977  Pedersen ........................ 415/500

OTHER PUBLICATIONS

Norbye, J. P. *The Gas Turbine Engine* Radnor, Pa., Chilton Book Co., 1975, p. 85.

*Primary Examiner*—Louis J. Casaregola
*Attorney, Agent, or Firm*—Cantor and Singer

[57] ABSTRACT

In a gas turbine power plant including at least three turbine rotors operating upon independent shafts, one rotor is designed to drive the compressor, one is designed to produce the main part of the power output and the third rotor is adapted to aid the two first mentioned rotors, variable transmission means being provided to interconnect the rotor shafts.

In order to improve part load efficiency this third rotor is provided with vanes being substantially slim and straight when compared with the conventional reaction type blades of a power turbine, whereby this third rotor may act as a power producing turbine during high loads, and as a power consuming fan during part and low loads.

4 Claims, 14 Drawing Figures

GAS TURBINE-TRANSMISSION PLANT

This application is a continuation-in-part of Ser. No. 834,920, 9/20/77, now abandoned.

BACKGROUND OF THE INVENTION

Certain gas turbines for automotive plants, operating according to a conventional working process, include a gas producing portion comprising a compressor and at least one turbine rotor driving the same, as well as a turbine part, comprising at least one power turbine rotor and at least one auxiliary turbine rotor. The three types of rotors are interconnected by transmission means permitting transfer of power from the auxiliary rotor to the compressor rotor and/or to the power turbine.

With the conventional working process it is very difficult, during low loads upon the plant, to obtain a satisfactory efficiency and a low fuel consumption during idle running. The drawbacks may be reduced by the use of adjustable guide vanes (variable geometry) at the turbine part, as well as at the compressor part, and by using an automatically variable transmission with a divisible torque flow and/or a direct reduction gear. That will, however, imply considerable cooling problems, and also high production costs, in relation to the low power required for small cars. The present invention provides a solution of above mentioned difficulties, and proposes a novel, combined working process, where one of the rotors has been formed and introduced in a basically novel manner, whereby it will operate as a turbine (during high load), or as a turbo-fan (during part load), and whereby further one or more stator members may be simplified, or omitted.

When a conventional gas turbine plant, having stationary guide vanes, operates at part load the flow of gas through the plant will be reduced by the speed and the pressure being lowered. The maximum turbine temperature (Tmax), and thus also the thermal efficiency, will then be reduced, and it is difficult to maintain an acceptable part-load economy. The highest, theoretical thermal efficiency ($\eta_{tt}$) and the average thermal efficiency ($\eta_t$), which is proportional to the highest efficiency, are dependent upon Tmax; according to $\eta_{tt} = (Tmax - To)/Tmax$ and it is evident, that it, also during part-load operation, is desirable to maintain the temperature as high as possible. In order to maintain a high Tmax, and a corresponding high $\eta_{tt}$ it is necessary that the specific load upon the compressor turbine is maintained at a high level, or preferably is raised, when the pressure drop across said turbine, and the temperature, are reduced and/or the volume of air (gas) is reduced. The Tmax should preferably be raised during part-load operation in order to compensate other reducing actions during part-load. This may be acceptable with respect to resulting strains, as the mechanical stresses upon the rotor components will be reduced due to the lowered speed. A balancing will, however, have to be made with respect to heat losses (insulation) and oxidation (surface treatment ceramics).

SUMMARY OF THE INVENTION

According to the invention it is now proposed that the auxiliary turbine and its connection to the transmission means is designed and arranged so the auxiliary turbine, when the plant is operating at part load, will impose a load upon the compressor turbine, i.e. increase its specific work, by the auxiliary turbine operating as a fan, and furthermore that the fuel supply to the combustor is arranged so as to maintain, during a substantial part of the part load range, a temperature upstream of all turbine rotors being substantially equal to that representing full load. The plant preferably includes an efficient air preheater for utilizing the higher turbine exhaust temperature. The vanes of the auxiliary turbine are designed so they will operate efficiently also within the fan range, i.e. they are substantially straight and rather slim, but have a rounded and aerodynamically favourable inlet edge. The auxiliary turbine will thus, during full and intermediate load, operate as a turbine, but as a fan during low loads (and during engine braking, the auxiliary turbine then being driven by the compressor turbine and/or by the power turbine).

The thermodynamic losses during re-compression in the turbine part (at part load) will be recovered to between 90 and 95% in the heat exchanger, and furthermore a certain reheat gain is obtained in the following turbine stage. The arrangement further reduces non-reclaimable transmission and oil cooler losses, which means a noticably increased gain for the plant as a whole.

As the turbine system, due to the low intertia of the rotor system, will permit a rapid acceleration it will be possible to design the plant for an extremely low idling speed, with a low idling fuel consumption. This rapid acceleration is obtainable without any noticeable overtemperature, which results in low emission contents in the exhaust gases (NOx), a simplified combuster and an increased useful life-time for hot turbine components.

DESCRIPTION OF SOME PREFERRED EMBODIMENTS

Figure 1:
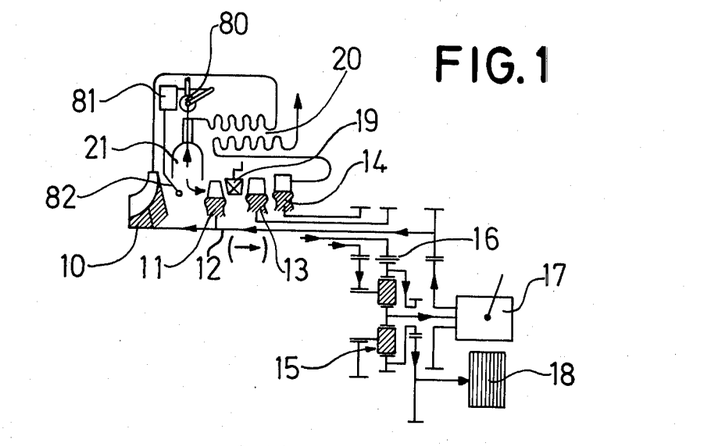
FIGS. 1-3 schematically show some turbine plants according to the invention.

The plant shown in FIG. 1 comprises a compressor rotor 10, a first turbine rotor 11, which is fitted upon the same shaft 12 as the compressor rotor, a second turbine rotor 13, here called the power turbine, and a third auxiliary rotor 14 (the turbo-fan).

The two last mentioned rotors operate upon shafts being concentric with shaft 12, but are arranged to operate in mutually opposite directions. All three rotors are interconnected by means of a planetary gearing, generally denoted by 15. This gearing includes an idler 16 adapted to reverse the direction of rotation torque from the intermediate shaft, before entering the planetary gearing.

The latter is combined with a variable transmission member 17, which makes possible an automatic variation in the torque transfer from the auxiliary rotor, by way of the sun wheel of the planetary gearing to shaft 12, or vice versa. The driven load is denoted by 18, and is meant to illustrate varying fields of use of the invention, even if an essential one is for automotive purposes.

Adjustable guide vanes 19 are provided between compressor turbine 11 and power turbine 13 in order to govern the flow of gas. The plant further includes a heat exchanger 20, and its combustor is denoted by 21. The latter is provided with adjustable fuel supply means.

An essential feature of the invention is that the auxiliary rotor, 14, is designed and adapted to operate as a turbine only during full or moderately high load upon the plant, but during lower and small part-loads (and during engine braking) to operate as a fan. The influence thereof, and the shape of the vanes of the auxiliary turbine will be described below in connection with FIGS. 4 and 5. By a readjustment of guide vanes 19 at the power turbine, it is possible to allot an increased portion of the pressure drop, and thus of the transfer into velocity and of the temperature drop, to power turbine 13. This means a corresponding reduction of the pressure drop within the compressor turbine 11, and within the auxiliary turbine 14, partly assisting the latter. Part of the power produced by the auxiliary turbine will, according to the system, be transferred to power turbine 13 and the compressor turbine 11 by way of the planetary gearing, but the power available will be reduced by the restriction caused by the adjusted guide vanes 19.

An important feature in operating gas turbine plants according to the invention is that the gas temperature is maintained about at Tmax, also during part loads.

The supply of fuel to combustor 21 is governed by a metering device 80. This is operated by a monitoring device 81 of arbitrary known type, receiving signals from a temperature sensing device 82, located downstream of the combustor, but ahead of the first turbine rotor.

Monitoring devices 18 are known in the art, and may be programmed so they, beside the temperature signal, take such factors as the heat content of the occasional fuel to be used, the ambient temperature, and so on, into consideration.

Figure 2:
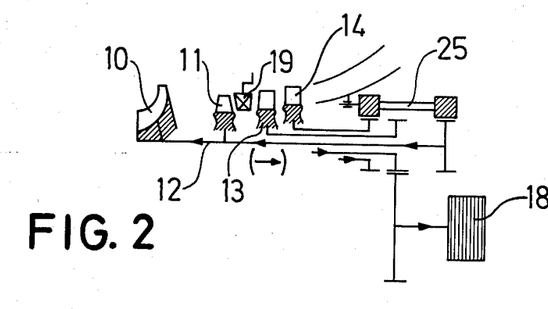

FIG. 2 shows a simplified version of the plant according to FIG. 1. The power turbine 13 is directly connected to load 18, while the auxiliary rotor is connected to the compressor spool by a mechanical transmission member 25 having a fixed reduction ratio. Evidently any variable type of transmission may be used.

Figure 3:
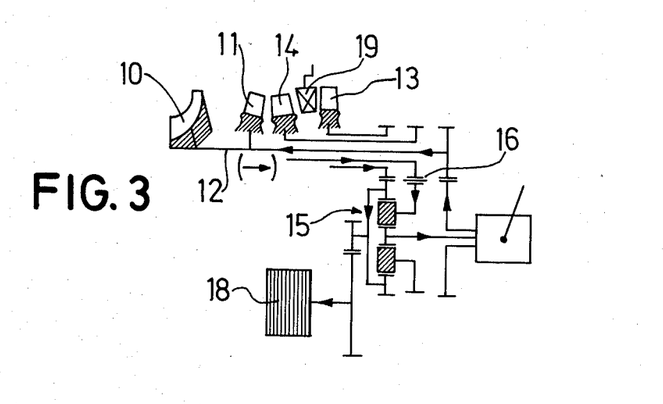

FIG. 3 shows the same basic components as FIG. 1, but here the power turbine 13 is located at the outlet end, preceeded by adjustable guide vanes 19, while the auxiliary rotor 14 is mounted directly downstream of the compressor turbine 12 and rotates in a direction opposite to that of the latter.

With this arrangement the aerodynamic outlet energy of the power turbine will not be fully utilized directly as turbine power, but may be partly reclaimed as pressure in an outlet diffusor, and may then be recovered as heat in the gas section of the heat exchanger. With respect to torque and efficiency this embodiment is not as favourable as a plant, where the power turbine is fitted as an intermediate stage, but on the other hand the following vane elements will not be subjected to the high outlet velocity downstream of the power turbine, when this is stalled, or nearly so. This permits the flow to pass from supersonic flow to sub-sonic flow, without any mach-impact occuring at the diffusor, if only the speed of the gas in an axial section, i.e. the speed of transportation, is below the velocity of sound, which is always the case with these designs. The embodiment according to FIG. 3 may, in view of the facts related above, be attractive, especially with small and inexpensive automative plants, where very small and exact turbine bladings for high mach members may be a production cost problem.

Figure 4:
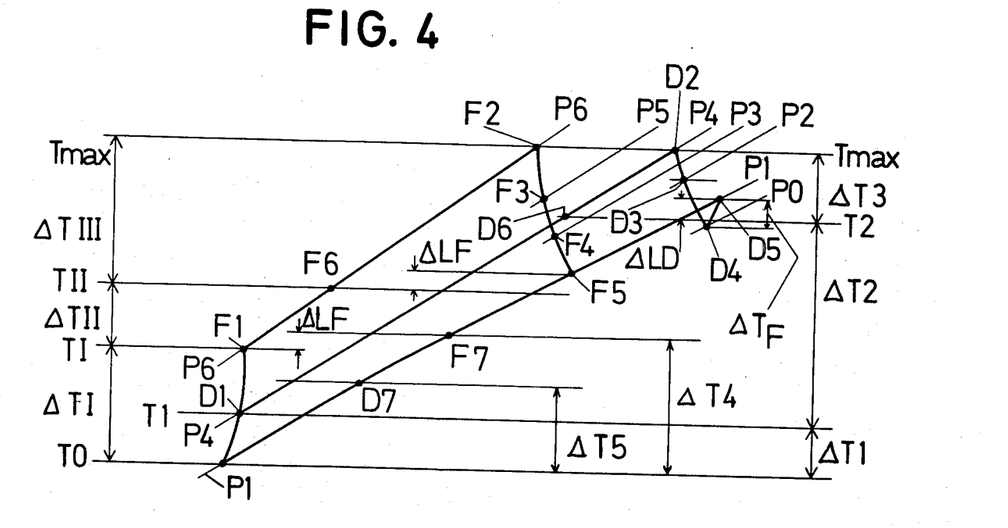
FIGS. 4 and 5 illustrate the new operating process (involving a combined turbine and fan), being IS-diagrams covering the plants according to FIG. 1 and FIG. 3, respectively, FIGS. 6a and b show the vane system of the plant according to FIG. 1, FIGS. 7a and b show the vane system of the plant according to FIG. 3.
Figure 5:
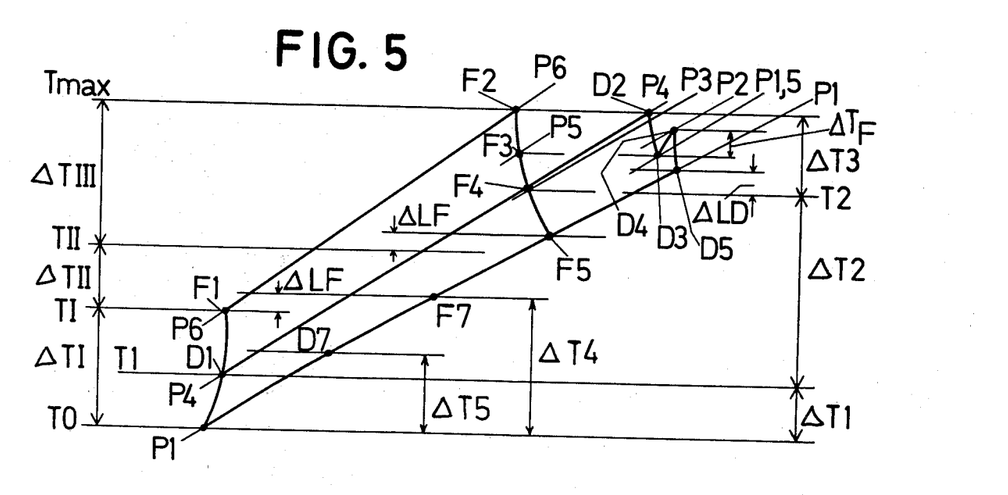

The working conditions during full load and part load are illustrated in FIGS. 4 and 5, which show TS-diagrams for power plants according to FIGS. 1 and 3, respectively, i.e. with the auxiliary turbine located as last step, and as second step, respectively.

A full load condition is in each of FIGS. 4 and 5 denoted by F and a part load condition by D. Pressure lines are denoted by Po–P6 and temperatures to To–Tmax.

In FIG. 4 compression starts at P1 and raises to P6 at point F1. A certain increase of temperature will occur simultaneously, and thereafter heat is added in the heat exchanger and in the combustor, so Tmax is reached at point F2, which corresponds to the inlet to the first turbine stage. Expansion will occur, which means that pressure and temperature drop to values indicated at point F3, which corresponds to the inlet to the second turbine stage, and point F4, respectively, which corresponds to the inlet to the third turbine stage. Downstream of the third stage, point F5, the gasses flow through the heat exchanger to the atmosphere, point F7, an inevitable loss in pressure and temperature occuring.

For the sake of simplicity the diagram does not show any pressure losses, because it is the air, compressed to TI, which is to be heated. The heat loss in the heat exchanger is denoted by $\Delta LF$, and a temperature of TII is obtained downstream of the heat exchanger. The temperature of the exhaust will be $\Delta T4$ above that of the ambient air (To).

The heat added is thus $\Delta TI$ due to the compression, $\Delta TII$ due to the heat exchanger and $\Delta TIII$ due to the combustor. The heat loss in the exhaust is $\Delta T4$.

A conventional operation during part load would have been to raise the part load temperature solely by reducing the flow of air, i.e. by reducing the flow area past the guide vanes to the power turbine, or by imposing a power consuming, mechanical load upon the compressor turbine. The first mentioned method will bring about certain flow losses, which only partly may be reclaimed as heat, and the other method will result in un-retrievable friction losses, so both methods will mean a reduction of the efficiency. According to the last mentioned method, further, additional power is consumed during cooling of the heat generated by the friction, which still further decreases the efficiency and also increases the installation costs.

With a plant according to the invention the maximum temperature, and thus also the efficiency during part load, is maintained at substantially the same level as during full load. There is, further, a possibility of increasing Tmax during part load conditions in order to obtain an especially fine part-load economy, which, however, calls for oxidation resistant material (for instance surface treatment or ceramics).

With the part-load case illustrated compression will raise the pressure to P4, and from point D1 to point D2 the temperature is raised by recovery from the heat exchanger $\Delta T2$, and heating by the combustor $\Delta T3$ in such a manner that the expansion can start at Tmax. The condition at the inlet to the second turbine stage is denoted by point D3, and the condition at the inlet to the third turbine stage by point D4. The expansion in the second turbine stage will thus mean a reduction to below point P1. Then a compression and corresponding increase of temperature occurs to point D5. This means an increased pressure drop across the second turbine stage, i.e. the power turbine, while the power required to perform the compression imposes a load upon the compressor turbine, which results in a favourable part-load regulation. About 95% of the fan losses will be recovered in the heat exchanger while simultaneously the transmission losses will be reduced. Also here an inevitable heat loss, ΔLD, must be accepted at the heat exchanger, but the air will here, downstream of the compressor, only have reached a temperature of T1. The heat recovery in the heat exchanger will therefore be comparatively high, which evidently is important for the economy. The possibility of maintaining a high Tmax, also during very low condition, is an essential feature of the invention, and results in a favourable fuel economy. The system further permits an extremely rapid acceleration and a low idling speed at the compressor, and thus a low idling fuel consumption. A ceramic insulation is preferable.

The same references are used in FIG. 5. During part-load conditions Tmax is reached at point D2. The gas is expanded to D3 in the first turbine stage, is then compressed to D4 in the second stage, and then again expanded in the third stage to D5. Here part of the turbine/fan losses are reclaimed as reheat in the last turbine stage, and the residual heat is recovered in the heat exchanger.

In order to permit the auxiliary rotor to operate as a turbine, as well as a fan, for instance without any preceeding guide vanes, it is necessary that its rotor vanes are designed in a special manner. As is evident from FIGS. 6 and 7, the vanes 30 of auxiliary rotor 14 are substantially straight and noticeably slim. The angles of entrance will have to be selected with respect to the desired constructional data, i.a. mass flow, speed and output. The vane grid of this step is designed to provide a low contraction or a small deflection.

Figure 6A:
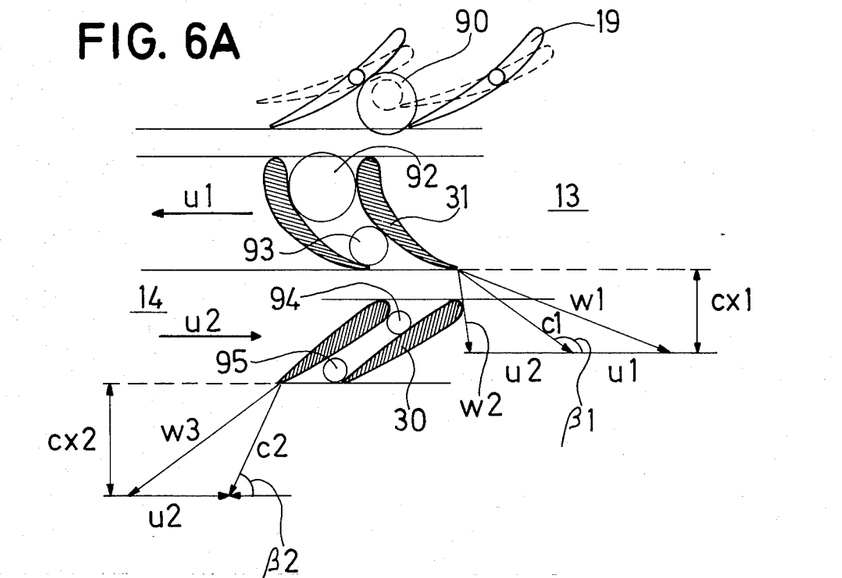
Figure 6B:
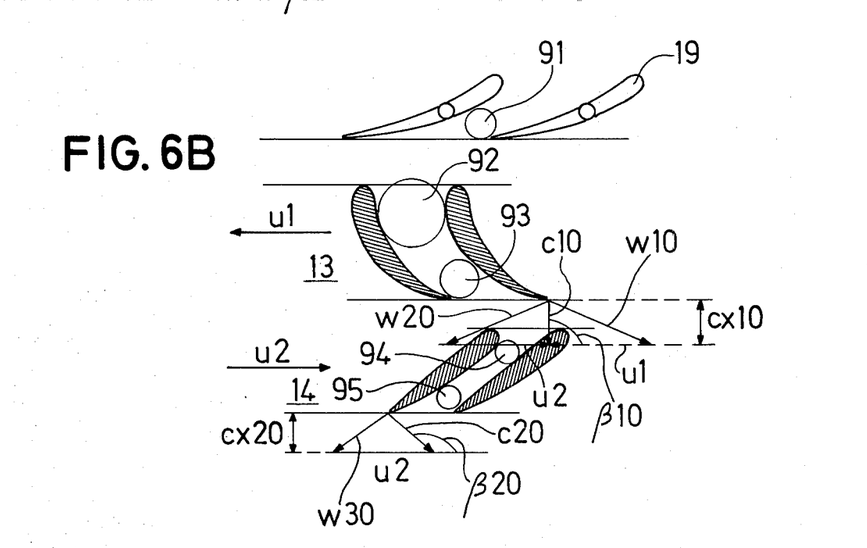

FIGS. 6a and 6b show the vane arrangement for a plant according to FIG. 1, the vanes of the compressor turbine being omitted. Vanes 31 of rotor 13 are of a conventional type providing a degree of reaction, whereas the vanes 30 of rotor 14 are substantially slim and straight when compared with vanes 31, but have like those a rounded and aerodynamically favourable inlet edge.

In FIG. 6a the passage area at guide vanes 19 is illustrated by circle 90 and in FIG. 6b the restricted passage area is illustrated by circle 91. At vanes 31 the passage area at the inlet end is illustrated by circle 92 and the area at the outlet by circle 93, showing a marked reduction, and thus a reaction operation.

The passage area at the inlet of vanes 30 is illustrated by circle 94, and the area at the outlet by circle 95. Circles 94 and 95 are about equal indicating insignificant expansion at these vanes. The activity at these vanes will thus, beside from the geometry, depend upon the rotational speed and the size and direction of vectors C1 and C10, respectively.

By adjusting the position of guide vanes 19 it is possible to vary the mass flow and also to vary the angle of entrance to vanes 31 of the power turbine. A counter-rotation arrangement will provide a favourable flow condition at the inlet to the auxiliary turbine 14, also without any guide vanes between the same and power turbine 13.

FIG. 6a shows a condition, where the guide vanes 19 are brought to about full open position, whereas FIG. 6b shows the guide vanes in a rather restricting position.

The following definitions are used. It is assumed that the selected mass gas flow will result in an axial gas velocity cx at the rotor in question. In the common velocity triangles w is used for vectors indicating velocities in relation to moving parts (the vanes), and c velocities in relation to stationary parts (the housing). The speed of rotor 13 is denoted by U1, and the speed of auxiliary rotor 14, rotating in the opposite direction, is denoted by U2. In this example the speeds are equal.

The mass flow selected in FIG. 6a results in an axial gas velocity cx1, which gives a relative outlet velocity w1 downstream of vanes 31, which in view of the rotational speed U1 provides an absolute inlet velocity c1 to vanes 30. The actual, relative velocity, of the gases entering vanes 30, taking the rotational speed of rotor 14 into consideration, is denoted by w2.

The axial velocity downstream of vanes 30 is denoted by cx2, being bigger than that at rotor 13 due to the expansion of the gases. The relative outlet speed is denoted by w3, and taking the rotational speed U2 into consideration, the resulting absolute speed is denoted by c2.

Of interest here is angle $\beta1$ between vector c1 and a transverse plane, as well as angle $\beta2$ between vector c2 and the peripheral velocity.
The indication
$\beta1 - \beta2 > 0$ shows that rotor 14 acts as a turbine, i.e. deflects the flow oppositely to the rotational speed of blade row 30.

FIG. 6b shows a condition, where the guide vanes 19 permit a restricted gas flow only, resulting in a reduced axial velocity c×10 at rotor 13. The same references are used at the vectors, however, with indexes raised by a multiple of ten.

Due to the action of vanes 30 c×20 will here be about the same as c×10.
Here
$\beta10 - \beta20 < 0$ indicates that rotor 14 acts as a fan, i.e. deflects the flow in the same direction as the rotational speed of blade row 30.

Figure 7A:
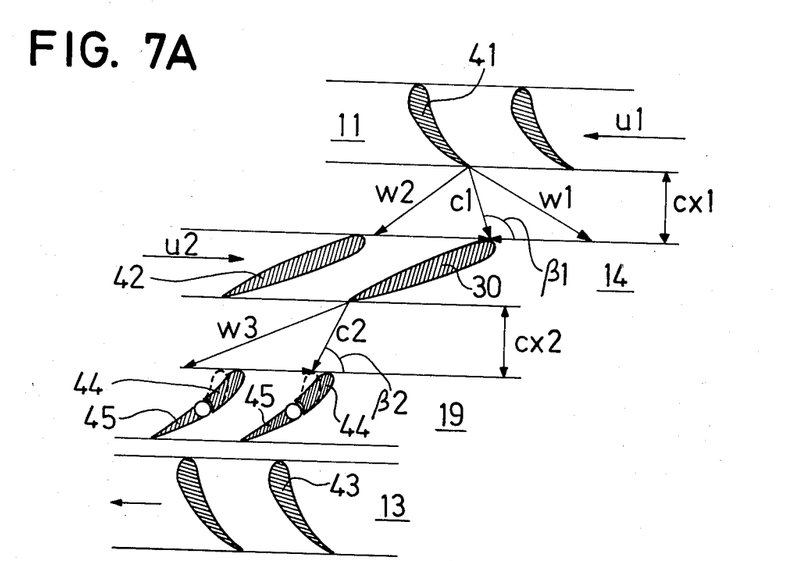
Figure 7B:
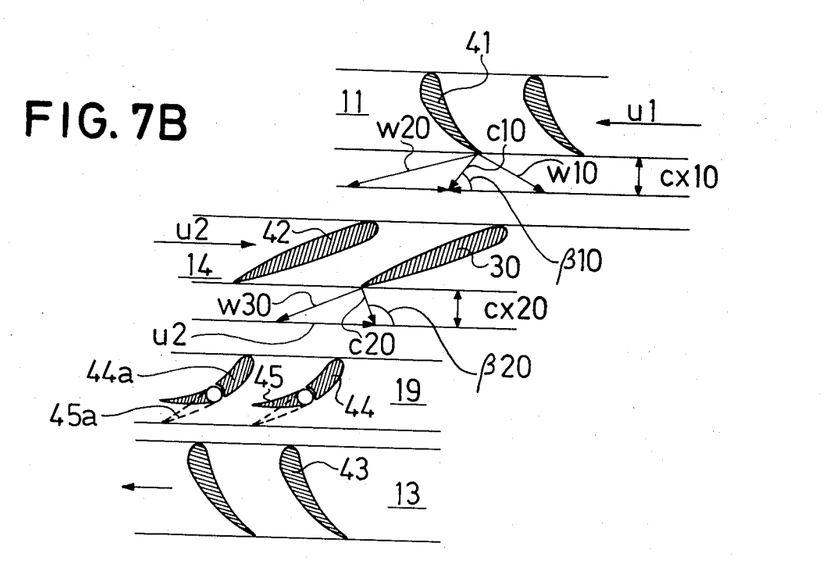

FIGS. 7a and 7b show the same conditions for a plant according to FIG. 3, where the auxiliary turbine rotor 14 is located downstream of compressor turbine 11, and rotates in opposite direction to the latter. The guide vanes are here located between rotors 14 and 13. The vanes of the auxiliary rotor 14 are denoted by 42, and those of power turbine 13 are denoted by 43.

The guide vanes must not be angularly displaced in their full length, it will be sufficient to vary the nose portion, or the tail portion, respectively. FIGS. 7a and 7b show two alternatives, the guide vanes of FIG. 7a having an angularly adjustable nose portion 44 and a stationary tail portion 45.

In FIG. 7b the nose portion 44a is stationary, whereas the tail portion 45a is adjustable. It is, however, evident that the selection of guide vane design will depend partly upon factors not directly bound to the invention, and that divided guide vanes could easily be used with the arrangement according to FIGS. 6a and 6b, and that one-piece vanes could be used in FIGS. 7a and 7b.

Figure 8:
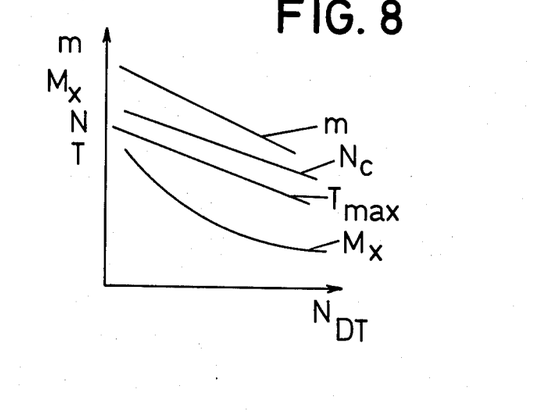
FIG. 8 is a diagram illustrating certain operating conditions referred to the speed of the auxiliary.

FIG. 8 shows the relation between compressor speed Nc, gasflow m, maximum temperature Tmax and torque output Mx for a given throttle position and a variable output speed. It is evident that these parameters will increase as the speed of the power turbine is reduced, as the outlet energy of the power turbine is here directly transferred to the auxiliary turbine, which assists the compressor turbine. The transfer of torque will increase noticeably with reduced speed of the power turbine due to increased output and speed to the compressor and thus increased flow of air. This will be further noticeable due to the increased mass flow caused by the increased turbine temperature (Tmax), which is a feature of the invention.

The compressor speed and the gas flow will, however, be reduced for a given power turbine speed, while for instance Tmax may be maintained substantially constant for a given ratio between mass flow (m) and power turbine speed (NDT), as determined by a pre-programmed governing system.

Figure 9:
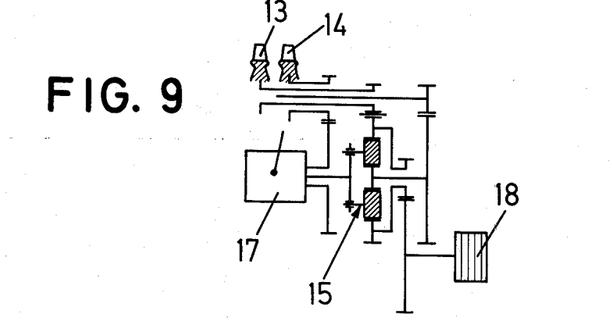
FIGS. 9-12 show some further plants designed according to the invention.

FIG. 9 shows a modification of the gearing according to FIG. 1, differing from the latter by the variable transmission 17 being fitted between auxiliary turbine 14 and planetary gearing 15. In this manner the variable transmission may be fully utilized for varying the speed of the auxiliary rotor within a wide field of operations. Guide vanes 19 may furthermore be omitted, so that plant operates without any guide vanes at all with the three, counter-rotating rotors. Even when the turbine is stalled or operates at low speed no high inlet mach number will appear at the auxiliary rotor as the latter, due to its high speed will encounter a comparatively small, relative inlet velocity, and thus considerably reduced inlet losses. The variable transmission, which may eliminate the guide vanes, is on this occasion preferably designed to handle the full auxiliary rotor torque, as compared with 30-40% in the previous plants. The advantages of this simplified and compact turbine plant are significant, especially for small cars, where power is not so important as reduction in costs.

The system further is favourably suited to the use of ceramic turbine rotors, for instance in the two first stages, while a rotor of metallic material, having high inertia capacity is used as the third stage. This will permit a rapid acceleration. With small plants a cheap belt driven transmission may be used as the variable component. Air bearings are preferably used for carrying the rotor shafts, as they have small losses and small bearing clearances, which means small clearances between the tips of the vanes and the surrounding casing.

Figure 10:
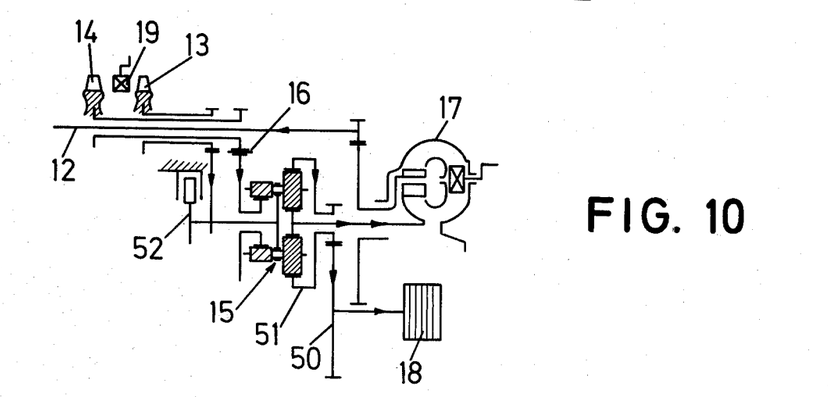

FIG. 10 shows an embodiment where the output shaft, by way of a gear wheel 50, is connected to the rim wheel 51 of the planetary gearing. During stall and stationary ring wheel 51, and thus a non-rotating output shaft, the auxiliary rotor and the power turbine will rotate with the planetary gear wheel carrier and the sun wheel, respectively. The intermediate turbine stage 14, being connected to the sun wheel will rotate at the highest speed and may be regarded as the auxiliary turbine, while the last turbine stage 13 will rotate more slowly (for instance at about 30-40% of the speed of the auxiliary rotor) and may be regarded as the power turbine. With this arrangement the aerodynamic outlet losses from the power turbine will be reduced, and the deflection and mach number losses will be more evenly distributed over the two last turbine stages.

The variable transmission here includes a three components hydrodynamic torque converter, having a pump, a turbine and a stator enclosed in a stationary casing. In order to provide the best efficiency the turbine rotor is made to enclose the pump rotor, and is furthermore mounted close by the gearing, while the variable stator is fitted at the remote side of the casing, permitting an easy attachment to a servo-operated governing means and simplified servicing. The transmission is preferably designed for a low torque compared to that of the auxiliary turbine, so the flow losses, during normal operation will be low (about 2-3% of the total power output at a 90% converter efficiency, and a torque ratio of 20-30%).

The heat losses may be used for heating the cabin of a car, or for air condition (heat exchanger batteries) if the transmission casing has suitable cooling flanges, and a fan and means for controlling the heating of the ventilation air is provided. The same lubricant oil may be used in the gas turbine and in the transmission, which means that only one pump, one filter, one sump and one oil admission opening are needed. The transmission may be provided with a clutch and/or a free-wheel for by-passing whenever desirable.

The embodiment according to FIG. 10 may be modified in several ways. A higher torque ratio during reverse may be obtained if a second ring wheel, meshing with the small-diameter parts of the planetary gears is provided, and is instead connected to the brake 52. Furthermore a "direct drive" may be obtained by interconnecting two components of the planetary gearing by means of a lamella clutch, a conical clutch or any other suitable type of clutch. A free wheel and/or clutches may be provided at suitable points, to make possible increased engine braking properties, and so forth.

Figure 11:
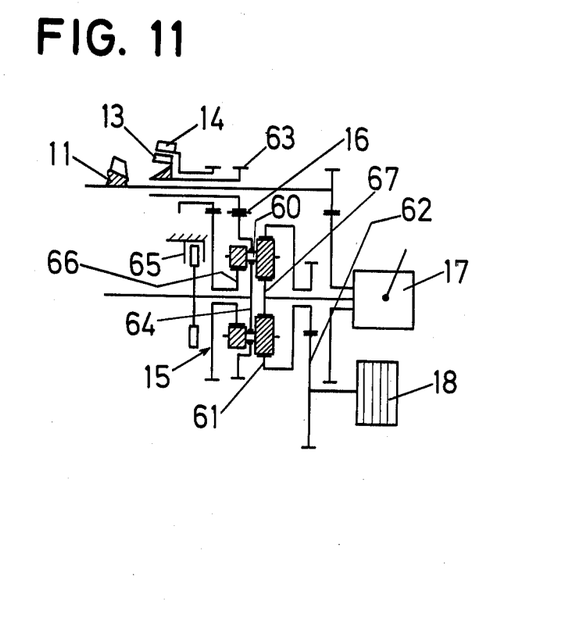

With the embodiment according to FIG. 11 the planetary gearing 15 is provided with stepped planetary gears 60, as in FIG. 10, instead of the simple planetary gears of FIGS. 1 and 3. Here the output shaft is connected to the ring wheel 61 of the planetary gearing. With the arrangement shown, reverse drive is obtainable in a simple manner by way of a gear rim being fixedly mounted upon the planetary gear carrier 64 and meshing with a pinion 63 at the shaft of power turbine 13 by way of an idling wheel 16. The planetary gear carrier 64 may be locked by means of a clutch 65. By the latter the power turbine will be stalled, while simultaneously guide vanes between the two rotors (not shown) are re-adjusted to provide the least possible resistance across the power turbine/auxiliary rotor guide vanes in order to permit a maximum of power at the auxiliary turbine rotor. The guide vanes shall be adjusted to an angular position permitting optimal flow conditions, whether said guide vanes are located upstream of, or downstream of the power turbine rotor. When the planetary gear carrier 64 is locked the planetary gearing will serve as a reverse gearing for the auxiliary turbine, which will provide all the torque and, by way of the left hand sun wheel 66, will drive ring wheel 61 and thus the output shaft in a direction opposite to that during normal operation, i.e. reverse drive is obtained. The variable transmission 17 is here connected to the right hand sun wheel 67.

Figure 12:
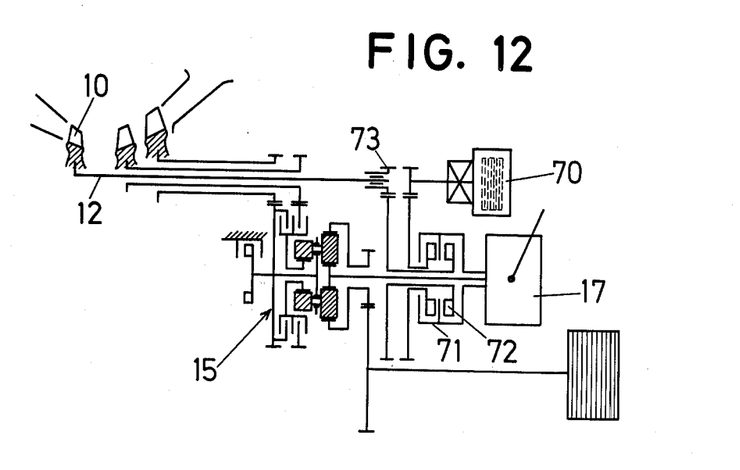

FIG. 12 shows an embodiment where a fly-wheel accumulator 70 is added, the fly-wheel preferably being of a fast rotating type working under vacuum. The fly-wheel is charged by surplus power from the auxiliary turbine, which with the proposal according to the invention is the normal way of charging. Charging may, however, be supplied by the car itself, for instance when running down-hill, or during "engine-braking," by way of clutch means being manually or automatically switched-in.

By means of clutches 71 and 72 and free wheel 73 a high degree of freedom with respect to charging and retrieval of power is obtainable. It will thus be possible to use the power for augmenting an undersized gas turbine, or for special occasions, together with a gas turbine having a normal output ratio. The accumulated power may also be used temporarily as the sole driving means, when the gas turbine is cut out, during indoor operation, for instance in a garage or other confines where special caution must be observed. By a suitable adjustment of the planetary gearing 15 and the clutch members, as well as the guide vanes of the turbine for lowest torque absorption the losses in the turbine system will be very low. Instead of a fly-wheel accumulator an electric accumulator, including a combined generator/motor, may be used. The plant described will be especially suited for ambulances, lorries having to operate for part of the time indoors, taxis and other vehicles adapted for noiseless and/or emission-free transportation.

The variable stator may, as above mentioned, be substituted by a fixed stator and a variable transmission, and for certain applications of the invention, including an infinitely variable transmission, one or more stators may be omitted. This presupposes certain basic combinations of automatic means and exchange ratios in the variable transmission, as well as a suitable shape of the profiles of the rotor vanes.

The invention above described is not limited to the embodiments shown, but the components of the plants may be varied in many ways within the basic principles of the inventive idea.

What I claim is:

1. A gas turbine-transmission plant which operates at a temperature $T_{max}$ at full load comprising:
   (A) a combuster,
   (B) adjustable fuel supply means to said combuster,
   (C) said fuel supply means being adapted to provide, during part load and at a given turbine speed, a gas temperature, upstream of all turbine rotors, being substantially equal to $T_{max}$,
   (D) a compressor part comprising a compressor and at least one turbine rotor driving the same for delivering air to said combustor,
   (E) a turbine part comprising at least one power turbine rotor connected to a load, and at least one auxiliary rotor arranged in a common gas flow passage from said combustor to thereby receive gas flow directly therefrom and rotating in a direction opposite thereto,
   (F) said power turbine rotor having conventional reaction type blades, and said auxiliary rotor having vanes with a symmetrical air foil cross section and with a rounded and aerodynamically favorable inlet edge arranged to form a vane grid providing essentially no expansion,
   (G) transmission means interconnecting said auxiliary rotor and compressor driving turbine rotor, and arranged to permit transfer of torque in both directions, and
   (H) means for determining the rotational speed of the said auxiliary turbine rotor, to impose a load on said power turbine when the plant is operating at part load, to make said auxiliary rotor act as a fan.

2. The plant according to claim 1, in which said at least one auxiliary rotor is mounted so as to receive the gas flow directly from the preceeding turbine rotor, without the intermediation of any guide vanes, and the means for determining the rotational speed of said auxiliary turbine rotor includes at least one power turbine rotor and an adjustable inlet guide vane stator at said at least one power turbine rotor.

3. The plant according to claim 2, in which at least one auxiliary rotor is located immediately downstream of said at least one power turbine rotor, the plant further including an air preheater which transfers residual heat, contained in the gases leaving the turbine rotors, to the air admitted to said combustor.

4. The plant according to claim 2, in which said at least one auxiliary rotor is located immediately downstream of the turbine rotor driving said compressor, the transmission means interconnecting said auxiliary turbine rotor and said compressor driving turbine rotor being of the variable type permitting determination of the rotational speed of the auxiliary turbine rotor.

* * * * *